(12) United States Patent
Hansen et al.

(10) Patent No.: US 10,730,247 B2
(45) Date of Patent: Aug. 4, 2020

(54) METHOD OF MANUFACTURING A SHEAR WEB USING A PRE-FORMED WEB FOOT FLANGE

(71) Applicant: LM WP PATENT HOLDING A/S, Kolding (DK)

(72) Inventors: Tim Moller Hansen, Vamdrup (DK); Kim Ansholm Rasmussen, Kolding (DK); Christian Lundsgaard-Larsen, Kolding (DK); Steven Hauge Pedersen, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 63 days.

(21) Appl. No.: 15/039,631

(22) PCT Filed: Dec. 1, 2014

(86) PCT No.: PCT/EP2014/076113
§ 371 (c)(1),
(2) Date: May 26, 2016

(87) PCT Pub. No.: WO2015/082404
PCT Pub. Date: Jun. 11, 2015

(65) Prior Publication Data
US 2017/0021575 A1    Jan. 26, 2017

(30) Foreign Application Priority Data

Dec. 3, 2013    (EP) ..................................... 13195482

(51) Int. Cl.
*B29C 70/44*    (2006.01)
*B29C 70/22*    (2006.01)
*F03D 1/06*    (2006.01)
(Continued)

(52) U.S. Cl.
CPC ............ *B29C 70/22* (2013.01); *B29C 70/342* (2013.01); *B29C 70/443* (2013.01);
(Continued)

(58) Field of Classification Search
CPC ..... B29C 70/22; B29C 70/443; B29C 70/342; B29C 70/44; B29C 70/68; B29C 70/86;
(Continued)

(56) References Cited

U.S. PATENT DOCUMENTS 2,674,327 A * 4/1954 Pullin .................. B64C 27/473
244/123.9
3,768,922 A * 10/1973 Dixon .................. B64C 27/473
416/226
(Continued)

FOREIGN PATENT DOCUMENTS

| EP | 2 213 445 A1 | 8/2010 |
|---|---|---|
| WO | 02/066235 A1 | 8/2002 |
| WO | 2013/037466 A1 | 3/2013 |

OTHER PUBLICATIONS

International Search Report dated Jan. 30, 2015 issued in corresponding International Application No. PCT/EP2014/076113.

*Primary Examiner* — Xiao S Zhao
*Assistant Examiner* — Ninh V Le
(74) *Attorney, Agent, or Firm* — Nath, Goldberg & Meyer; Jerald L. Meyer; Tanya E. Harkins (57) ABSTRACT

A method of manufacturing a wind turbine blade component in form of a shear web is described. The method comprising the steps of: a) providing a pre-manufactured shear web body having a first side and a second side as well as a first end and a second end; b) providing a first pre-formed web foot flange comprising a fibre-reinforcement material; c) arranging a first fibre layer from the first pre-formed web foot flange and to a part of the first side of the shear web body; d) arranging a second fibre layer from the first
(Continued)

pre-formed web foot flange and to a part of the second side of the shear web body; e) supplying a resin to said first fibre layer and second fibre layer simultaneous with or subsequent to steps c) and d); and f) allowing the resin to cure so as to form the shear web.

17 Claims, 5 Drawing Sheets

(51) Int. Cl.
*B29C 70/34* (2006.01)
*B29D 99/00* (2010.01)
*B29L 31/08* (2006.01)

(52) U.S. Cl.
CPC ....... *B29D 99/0003* (2013.01); *F03D 1/0675* (2013.01); *B29L 2031/085* (2013.01); *Y02E 10/721* (2013.01); *Y02P 70/523* (2015.11)

(58) Field of Classification Search
CPC .............. B29C 70/865; B29D 99/0003; B29D 99/0025; B29D 99/0028; F03D 1/0675; F03D 1/0633; Y02E 10/721; Y02P 70/523; B29L 2031/085
See application file for complete search history.

(56) References Cited

U.S. PATENT DOCUMENTS

| | | | |
|---|---|---|---|
| 6,374,570 B1* | 4/2002 | McKague, Jr. | B29C 65/56 52/762 |
| 6,465,902 B1* | 10/2002 | Beauchamp | F01D 5/148 244/215 |
| 2003/0037867 A1 | 2/2003 | Bersuch et al. | |
| 2006/0049552 A1* | 3/2006 | Fish | B29C 65/54 264/571 |
| 2007/0232171 A1* | 10/2007 | Maki | B29C 70/24 442/205 |
| 2009/0226325 A1* | 9/2009 | Gupta | B64C 11/20 416/226 |
| 2011/0052408 A1* | 3/2011 | Zuteck | B29C 70/22 416/241 R |
| 2011/0123344 A1* | 5/2011 | Yerramalli | F03B 3/121 416/226 |
| 2012/0027613 A1* | 2/2012 | Yarbrough | F03D 1/065 416/226 |
| 2014/0193269 A1* | 7/2014 | Wetzel | F03D 1/0675 416/230 |

* cited by examiner

METHOD OF MANUFACTURING A SHEAR WEB USING A PRE-FORMED WEB FOOT FLANGE

This is a National Phase Application filed under 35 U.S.C. 371 as a national stage of PCT/EP2014/076113, filed Dec. 1, 2014, an application claiming the benefit of European Application No. 13195482.8, filed Dec. 3, 2013, the content of each of which is hereby incorporated by reference in its entirety.

FIELD OF THE INVENTION

The present invention relates to a method of manufacturing a wind turbine blade component in form of a shear web body, and a shear web body manufactured according to the method.

BACKGROUND OF THE INVENTION

Wind turbine blades are often manufactured according to one of two constructional designs, namely a design where a thin aerodynamic shell is glued or otherwise bonded onto a spar beam, or a design where spar caps, also called main laminates, are integrated into the aerodynamic shell.

In the first design, the spar beam constitutes the load bearing structure of the blade. The spar beam as well as the aerodynamic shell or shell parts are manufactured separately. The aerodynamic shell is often manufactured as two shell parts, typically as a pressure side shell part and a suction side shell part. The two shell parts are glued or otherwise connected to the spar beam and are further glued to each other along a leading edge and trailing edge of the shell parts. This design has the advantage that the critical load carrying structure may be manufactured separately and therefore easier to control. Further, this design allows for various different manufacturing methods for producing the beam, such as moulding and filament winding.

In the second design, the spar caps or main laminates are integrated into the shell and are moulded together with the aerodynamic shell. The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load carrying structure. The blade shells are typically designed with a first main laminate integrated in the pressure side shell part and a second main laminate integrated in the suction side shell part. The first main laminate and the second main laminate are typically connected via one or more shear webs, which for instance may be C-shaped or I-shaped. For very long blades, the blade shells may further along at least a part of the longitudinal extent comprise an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

The shear webs act to reinforce the blade structure, and prevent excessive bending or buckling. Some blade designs use shear webs formed from beam members having I- or C-shaped cross-sections, the members having a main body with load-bearing flanges extending therefrom at opposed ends of the main body.

One method of manufacturing such I- or C-webs is through the provision of a sandwich panel body to which layers of fibre material are applied at the opposed ends in the shape of the desired flanges, the fibre material being infused with a resin and subsequently cured to form rigid flanges.

It is well-known to manufacture such shear webs in a suitably shaped mould structure, wherein a C-web can be manufactured using a relatively simple U-shaped mould, where the sandwich panel body extends between opposed walls of the mould structure, with the flanges formed through the layup of fibre material against the said walls.

Similarly, an I-web can be manufactured using a mould having a central support bounded by flexible support members on either side to define an adjustable channel between the flexible support members and the opposed mould walls. In this situation, the sandwich panel body is arranged on the central support, while the adjustable channel is arranged to receive fibre layers to form the flanges on a first side of the panel body, with the flanges on the second side of the panel body formed by the layup of fibre material against the opposed mould walls.

An example of such manufacturing systems can be seen in International Patent Application Publication No. WO 2013/037466 A1.

However, such systems require the provision of dedicated moulding tables for the formation of such shear webs, which can often be continuous structures in excess of 30-40 metres length, taking up considerable space in a blade factory. Also, the application, infusion and subsequent curing of the fibre layers to form the flanges of the shear webs require relatively precise alignment and working, resulting in considerable time and operational costs.

Furthermore, in the case of I-web manufacture, the particular flexible profiles used can be unique to the different design of blade and the associated I-web required. This can therefore result in additional manufacturing and setup costs when it is desired to produce I-webs for use in different wind turbine blades.

In addition to the above, shear webs having such resin-infused fibre-based flanges can be an area of interest for the prevention of structural faults and cracks, due to the relatively large forces transferred through said flanges.

It is an object of the invention to provide an alternative system and method for the manufacture of wind turbine blade components in form of shear webs, which provides for increased ease of manufacture combined with a reduced risk of structural failure.

SUMMARY OF THE INVENTION

Accordingly, there is provided a method of manufacturing a wind turbine blade component in form of a shear web, the method comprising the steps of:
 a) providing a pre-manufactured shear web body having a first side and a second side as well as a first end and a second end;
 b) providing a first pre-formed web foot flange comprising a fibre-reinforcement material, such as glass fibres;
 c) arranging a first fibre layer from the first pre-formed web foot flange and to a part of the first side of the shear web body;
 d) arranging a second fibre layer from the first pre-formed web foot flange and to a part of the second side of the shear web body;

e) supplying a resin to said first fibre layer and second fibre layer simultaneously with or subsequent to steps c) and d); and f) allowing the resin to cure so as to form the shear web.

Thus, it is seen that the first preformed web foot flange is attached to the shear web body by layering fibre layers from the web foot flange to the sides of the shear web, supplying the resin either by injection or as prepreg material, and then allowing the resin to cure so as to provide a permanent connection between the web foot flange and the shear web. This provides for the opportunity to manufacture the shear web body and the first web foot flange separately, which in turn allows for a more generic and modular design, where two parts can be shaped to a desired wind turbine shell shape without necessarily having to have large custom made web moulds for each wind turbine blade type. Thus, the shear web body may be simply supported in a work shop, e.g. using a plurality of simple table supports or a simple jig.

Overall, it is seen that the web foot flange(s) may be joined to the pre-manufactured shear web body by laminating it onto the sides of the shear web body, e.g. via overlamination. Such lamination replaces the use of structural adhesives that could be used for providing a load-bearing joint between the web foot flanges and the shear web body.

The method may advantageously also involve the step of attaching a second pre-formed web foot flange to the second end of the web body according to the same sequence, i.e. c2) arranging a first additional fibre layer from the second pre-formed web foot flange and to the first side of the shear web body; d2) arranging a second additional fibre layer from the first pre-formed web foot flange and to the second side of the shear web body; e2) supplying a resin to said first additional fibre layer and second additional fibre layer simultaneously with or subsequent to steps c2) and d2); and f2) allowing the resin to cure.

In the following, various embodiments may be discussed relating to the first web foot flange and will sometimes just be referred to as the web foot flange. However, it is clear that the embodiments also may also apply to the second web foot flange, which is attached to the second end of the shear web body.

According to an advantageous embodiment, a tackifier or SAERfix® fabric is supplied to the first fibre layer and the second fibre layer in order to maintain the shape prior to supplying resin to said first and second fibre layers in step e). Thus, it is ensured that the first and the second fibre layers maintain their shape so as to extend along the first side and the second side of the shear web body, respectively. If the first and the second fibre layers form part of the first pre-formed web foot flange, the tackifier ensures or at least partially ensures that the pre-formed web foot flange itself maintains its shape prior to being laminated onto the shear web body.

According to another advantageous embodiment, the pre-manufactured shear web body is a sandwich panel or a sandwich-structured composite member, e.g. having skin layers of reinforcement material, such as a fibre-reinforced composite material, applied to a relatively thick light-weight core material, such as balsawood or a foamed polymer. The core material may be a low strength material, but its higher thickness provides the sandwich composite with high bending stiffness with overall low density.

According to yet another advantageous embodiment, the method comprises the step of providing a forming tool adjacent at least the first end of the shear web body to form a mould cavity covering the first pre-formed web foot flange, the first fibre layer, the second fibre layer, and a part of the shear web body near the first end of the shear web body. Thus, the forming tool forms a relatively small mould cavity near the first end of the shear web body. Accordingly, only relatively small forming tools are needed instead of bulky equipment needed for manufacturing an integrally formed shear web body and web foot flange.

The mould cavity is preferably an elongate or oblong cavity extending along a part or the entire shear web body. The mould cavity may be substantially web foot flange shaped.

Advantageously, the forming tool comprises a first vacuum bag and possibly also a second vacuum bag. If only a first vacuum bag is used, it may cover the first web foot flange and be sealed against the first side and the second side of the shear web body. It is also possible to use two vacuum bags, e.g. a first for sealing the first fibre layer, and a second for sealing the second fibre layer. The vacuum bags may further be sealed against the pre-formed web foot flange or against a forming tool plate member supporting a base part of the pre-formed web foot flange.

Alternatively, the mould cavity may be formed using a dedicated tool comprising substantially rigid parts, such as made of a metal or inflexible plastic. Preferably, such rigid parts are shaped in accordance with the desired outer shape of the web foot flange or web foot flange connection.

Preferably, the method comprises the step of applying a sealant between said forming tool and said first end of said web member. The sealant may comprise a simple strip of material, possibly with adhesive properties, applied between edges of the forming tool and the surface of the web member, e.g. a silicone gel.

In a particularly advantageous method, the resin in step e) is injected into the mould cavity. Advantageously, the resin is injected from a first longitudinal end of the mould cavity. The method may comprise injecting said resin at an overpressure, or at a pressure level above atmospheric pressure. Preferably, said step of injecting comprises applying a vacuum to the mould cavity. Thus, the resin is preferably supplied via vacuum infusion. The vacuum may advantageously be applied from an opposed second longitudinal end of the mould cavity.

In one embodiment, the pre-manufactured shear web body in step a) is arranged in a substantially vertical position, and wherein the first pre-formed web foot flange is arranged at the first end and below the shear web body. Thus, the resin may be supplied while the web foot flange and the shear web body are arranged in a substantially vertical configuration, and where the first fibre layer and the second fibre layer extend substantially vertically along the first side and the second side of the shear web body, respectively. This may compensate for build-up of air pockets in the laminate and creep of the fibre layers due to gravity.

The second pre-formed web foot flange may be arranged at the second end and above the shear web body and be infused in a similar manner. Alternatively, the shear web body may be turned 180 degrees and the second pre-formed web foot flange be attached to the shear web body in a subsequent infusion step, where it is arranged below the shear web body.

In another particularly advantageous embodiment, the first web foot flange comprises a base part having a first side and a second side, a first projection part projecting from the first side of the base part and a second projection part projecting from the second side of the base part so that a recess is formed between the first projecting part and the second projecting part. The first end of the shear web body may thus be arranged in the recess formed between the two projecting parts. The first end of the shear web body may be chamfered or bevelled. The recess may have a complimentary shape. A fibre layer may be arranged in the recess between the pre-formed web foot flange and the shear web body. The complimentary shapes may be shaped so that the angle between the web foot flange and the shear web body is pre-defined. The end of the shear web body and/or the cavity of the web foot flange may for instance be shaped via milling or a similar operation.

The fibre layer may be wrapped around the first end of the shear web body. Accordingly, the first fibre layer and the second fibre layer may be formed by a single fibre layer wrapped around the end and between the two bodies.

The first and the second projecting parts both comprise a first side part and a second side part. The first side part may be concave, and the second side may also be concave. Thus, the projections provide a smooth transition to the shear web body. The side parts of the projecting parts may also be defined as inner side parts (being the sides which face towards the shear web body, and outer side parts (being the sides which face away from the shear web body.

In one embodiment, the recess formed has a part circular cross-section with a first radius or curvature. In a second embodiment, the first end of the shear web body is rounded having a second radius of curvature. The second radius may be substantially equal to or slightly smaller than the first radius. Thereby, the two parts may be connected in a spherical joint like connection, and the first end of the shear web body may be angled arbitrarily and still fit the recess. Thereby, the angle between the shear web body and the web foot flange may more easily be varied in order to fit the aerodynamic shell part of the wind turbine blade.

In one embodiment, the recess has a measure of arc of 90-180 degrees, or 120-160 degrees, e.g. around 140 degrees. The measure of arc may be relatively high if only a small variable angle between the web foot flange and the shear web body is needed.

The first radius may advantageously be 10-100 mm, or 10-50 mm, e.g. around 20 mm. The shear web body may advantageously have a thickness of approximate 20-200 mm, or 20-100 mm, e.g. around 30 or 40 mm. The first radius and the shear web body thickness may also vary in the longitudinal direction. The shear web body may for instance be thicker near the blade root than near the tip, and the first radius may vary accordingly.

The first fibre layer and the second fibre layer may advantageously comprise a multiaxial fibre layer, such as a biaxial, triaxial or quadaxial fibre layer. Thus, the fibre layers comprise multiaxially arranged fibres, whereby loads can be transferred in several directions and thereby take up both longitudinal forces and transverse forces. It is also possible to use fibre layers having randomly oriented reinforcement fibres.

The resin may advantageously be polyester, vinylester or epoxy. The polyester may advantageously be chemically compatible with the resin matrix of the pre-manufactured shear web body.

The first fibre layer and the second fibre layer are advantageously made from glass fibres. However, the reinforcement fibres could also be carbon fibres, plant fibres, nylon, aramid or another suitable reinforcement fibre.

The first fibre layer and the second fibre layer may also be prepreg material, e.g. UV curing prepregs.

The pre-formed web foot flange may advantageously form an I-shaped foot with the shear web body, once it has been attached to the shear web body. The web foot flange may advantageously have a substantially flat base part.

The first fibre layer and the second fibre layer may advantageously extend along 5-20 cm of the first side and the second side of the shear web body, respectively.

In one particularly advantageous embodiment, the first pre-formed web foot flange is a pre-cured composite body. Thus, the pre-cured composite body may be a pre-manufactured body, e.g. formed in a separate mould prior to being attached to the first end of the shear web body. The pre-cured body may still have a degree of flexibility so that the angle between the web foot flange and the shear web may be varied or twisted in the longitudinal direction in order to accommodate the shape of the aerodynamic shell.

The pre-cured composite body is attached to the shear web body by applying the first and the second fibre layer overlapping the two bodies, supplying resin and finally letting the resin cure or harden. Accordingly, it is seen that the two parts are attached to each other via an overlamination as opposed to a structural adhesive or glue joint.

Further, the pre-cured body may act as a part of the forming tool that forms the mould cavity.

In one embodiment, the pre-cured composite structure is a pultruded or extruded body. Thus, the web foot flange may be pre-manufactured with a uniform cross-sectional shape according to known pultrusion or extrusion processes and cut to the desired length. The pre-manufactured web foot flange may then be bent into the desired angle relative to the shear web body so as to accommodate the shape of the aerodynamic shell.

The pre-cured web foot flange may be attached to the shear web body by use of a fibre layer between the inner side parts of the projecting parts and fibre layers arranged so as to cover a part of the base part, the outer side parts of the projecting parts, and the sides of the shear web body.

In a second particularly advantageous embodiment, the first pre-formed web foot flange is a sewn or weaved fibre body. Accordingly, the sewn or weaved fibre body may be pre-formed into an approximate desired shape. The first fibre layer and the second fibre layer may be integrally formed with the web foot flange. The fibre body may be manufactured as a continuous body and then cut to the desired length. Accordingly, this embodiment also provides a flexible method of manufacturing a wind turbine blade shear web.

If the pre-formed web foot flange is formed by use of the sewn fibre body, it may be necessary to provide a forming tool having a primary base plate member, which defines a primary surface or base of the finished web foot flange, and thereby the side that is later attached to the inner side of the aerodynamic blade shell. The base plate member may have to be angled in accordance with the desired angle between the web foot flange and the shear web body. However, the forming tool is still much smaller than a mould needed to manufacture an integrally formed shear web whereby the manufacture is much more flexible than existing methods of manufacturing shear webs.

The sewn fibre body may advantageously comprise dry reinforcement fibres, i.e. reinforcement fibres that have not yet been impregnated by a resin. Accordingly, a mould cavity may be formed by a forming tool surrounding the pre-formed body and sealed against the sides of the shear web body, after which a resin is injected into the cavity and finally cured in order to form the shear web. The sewn fibre body may alternatively comprise a prepreg material, optionally being a UV-curing prepreg material. In this embodiment, the formed mould cavity is substantially flange-shaped.

In one embodiment, the shear web body has a length of at least 30 metres. Accordingly, it is seen that the invention is directed towards the manufacture of very large shear webs, e.g. for wind turbine blades having a blade length of at least 40 metres. The shear web body may also be sectionised, e.g. by connecting pre-manufactured panels having a length between 8 and 12 metres. The web bodies may be connected to each other via an over-lamination at the seams. This may be carried out at the same time as the web foot flange is attached to the panels.

The web foot flange advantageously has substantially the same length as the shear web body. However, the web foot flange may also be sectionised or modular. The individual web foot flanges may for instance have a length of 1-10 metres.

As the profile of the wind turbine blade has a particular curvature, the base part or primary surface of the flange of the shear web may require arrangement at a specific angle relative to the web body. This angle may vary along the length of the component, dependent on the longitudinal profile of the blade. Accordingly, the forming tool may be made of a relatively flexible material to allow for variations in the angling of the tool along the length of the web member, and/or a plurality of forming tools may be used arranged at different angles relative to the web member along the length of the web member.

Preferably, said step of angling comprises arranging the web foot flange at an angle of between −20 to +20 degrees to the first end of said web member. Accordingly a primary plate member for forming the mould cavity may be similarly angled at an angle of between −20 to +20 degrees to the first end of said web member. It is also possible to vary said angles between −30 and 30 degrees.

The web foot flange may advantageously be formed with a shaped surface for attachment to the blade shell part, such as a rippled, hatched or scored surface profile. The shaped surface may be part of the pre-cured web foot flange, or the primary plate member of the forming tool may be configured to provide the shaped surface. The provision of a shaped or treated flange surface at the end of the component can provide a surface which provides an improved adhesive bond between components.

The invention further provides a shear web manufactured according to the aforementioned method. Accordingly, the invention provides a wind turbine component in form of a shear web comprising:
- a pre-manufactured shear web body having a first end and a second end as well as a first side and a second side, and at least
- a first pre-formed web foot flange, wherein
- the first pre-formed web foot flange is attached to the shear web body via
  - a first fibre layer extending from the first pre-formed web foot flange and to a part of the first side of the shear web body, and
  - a second fibre layer extending from the first pre-formed web foot flange and to a part of the second side of the shear web body, wherein
  - the first fibre layer and the second fibre layer are embedded in a cured resin matrix.

Overall, it is seen that the web foot flange(s) may be joined to the pre-manufactured shear web body by laminating it onto the shear web body, e.g. via overlamination. Such, lamination replaces the use of structural adhesives that could be used for providing a load-bearing joint between the web foot flanges and the shear web body.

Preferably, the first pre-formed web foot flange is attached to the pre-manufactured shear web by one or more overlaminations comprising the first fibre layer and the second layer, whereby the use of a structural adhesive may be avoided.

The invention further provides a wind turbine blade comprising a shear web according to any of the aforementioned embodiments, the shear web being connected between a pressure side and a suction side of the wind turbine blade.

The wind turbine blade may comprise a first spar cap attached to or integrally formed with a pressure side shell part and a second spar cap attached to or integrally formed with a suction side shell part. The shear web may be connected between the two spar caps, e.g. with the first web foot flange attached to the first spar cap and the second web foot flange attached to the second spar cap.

The invention additionally provides a wind turbine comprising at least one, and advantageously two or three, such wind turbine blades.

DESCRIPTION OF THE INVENTION

The invention is explained in detail below with reference to an embodiment shown in the drawings, in which.

Figure 1:
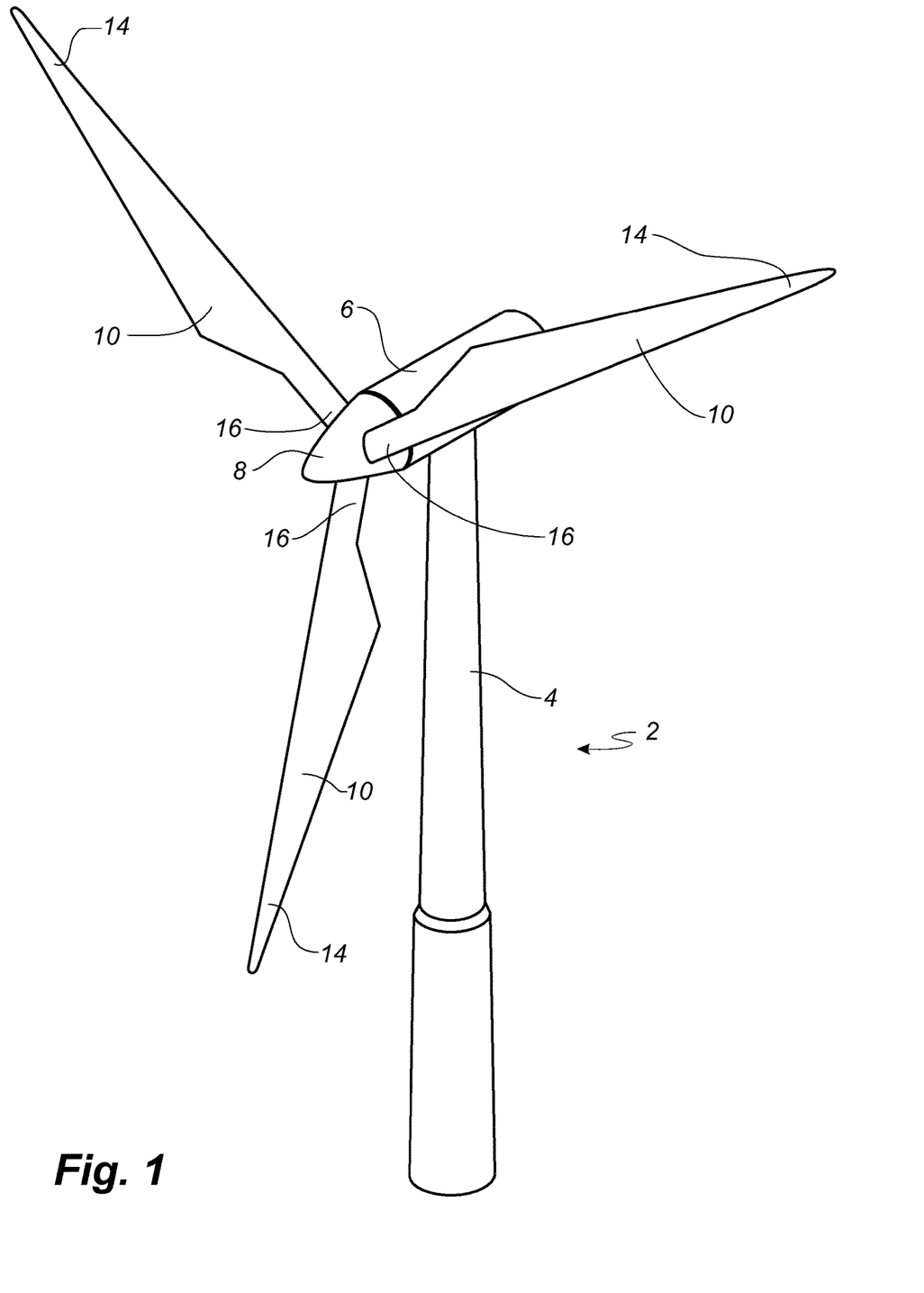
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
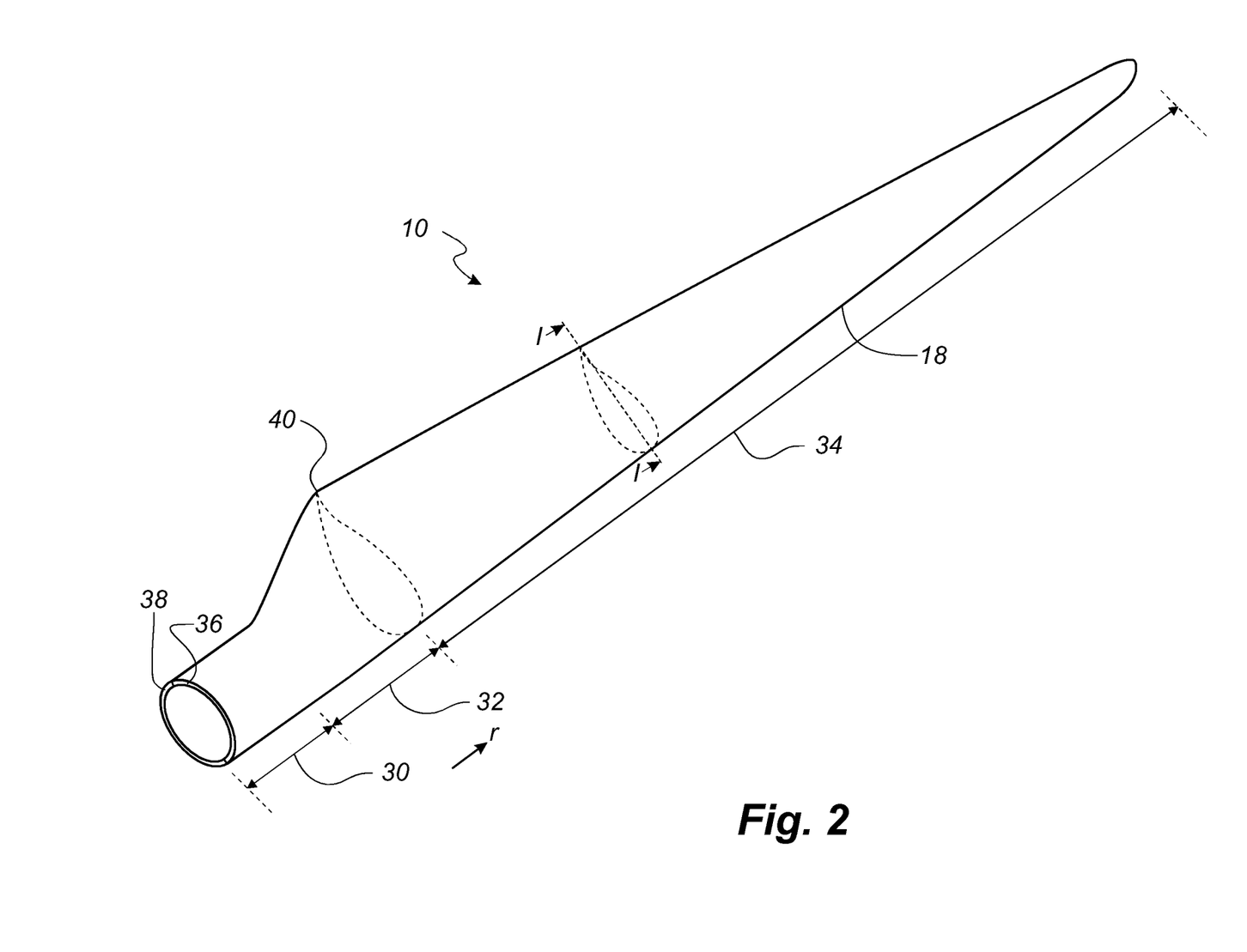
FIG. 2 shows a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

Figure 3:
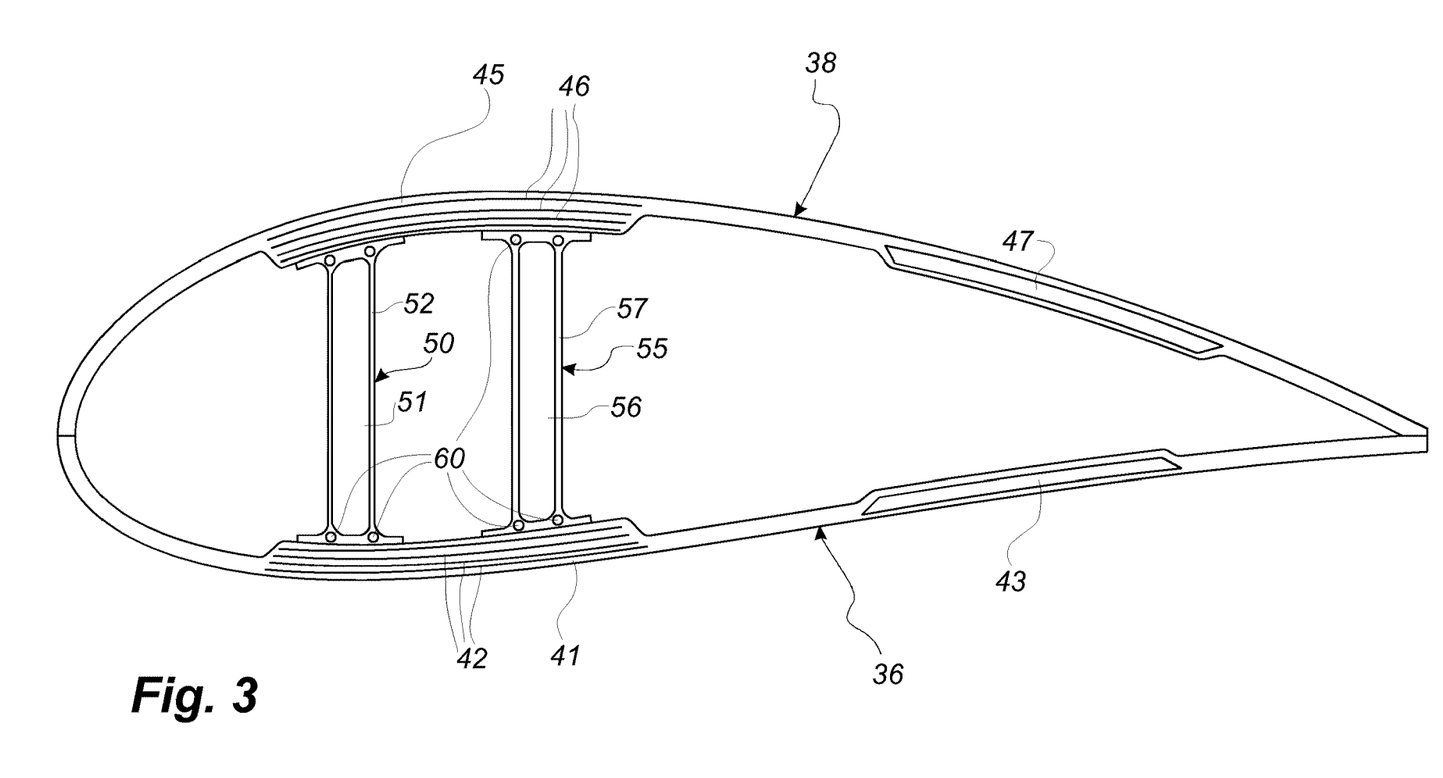
FIG. 3 shows a schematic view of a cross-section of a wind turbine blade.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as I-shaped webs. However, other configurations, such as C-shaped webs may also be utilised. The first shear web 50 comprises a shear web body and two web foot flanges. The shear web body comprises a sandwich core material 51, such as balsawood or foamed polymer, covered by a number of skin layers 52. The second shear web 55 has a similar design with a shear web body and two web foot flanges, the shear web body comprising a sandwich core material 56 covered by a number of skin layers 57. The sandwich core material 51, 56 of the two shear webs 50, 55 is chamfered near the flanges in order to transfer loads from the webs 50, 55 to the main laminates 41, 45 without the risk of failure and fractures in the joints between the shear web body and web foot flange. However, such a design will normally lead to resin rich areas in the joint areas between the legs and the flanges. Further, such resin rich area may comprise burned resin due to high exothermic peeks during the curing process of the resin, which in turn may lead to mechanical weak points.

In order to compensate for this, a number of filler ropes 60 comprising glass fibres are normally arranged at these joint areas. Further, such ropes 60 will also facilitate transferring loads from the skin layers of the leg to the flanges. However, according to the invention, the web foot flanges and the shear web body are manufactured separately, and the web foot flanges are then laminated onto the ends of the shear web body.

The blade shells 36, 38 may comprise further fibre-reinforcement at the leading edge and the trailing edge. Typically, the shell parts 36, 38 are bonded to each other via glue flanges in which additional filler ropes may be used (not shown). Additionally, very long blades may comprise sectional parts with additional spar caps, which are connected via one or more additional shear webs.

Figure 4:
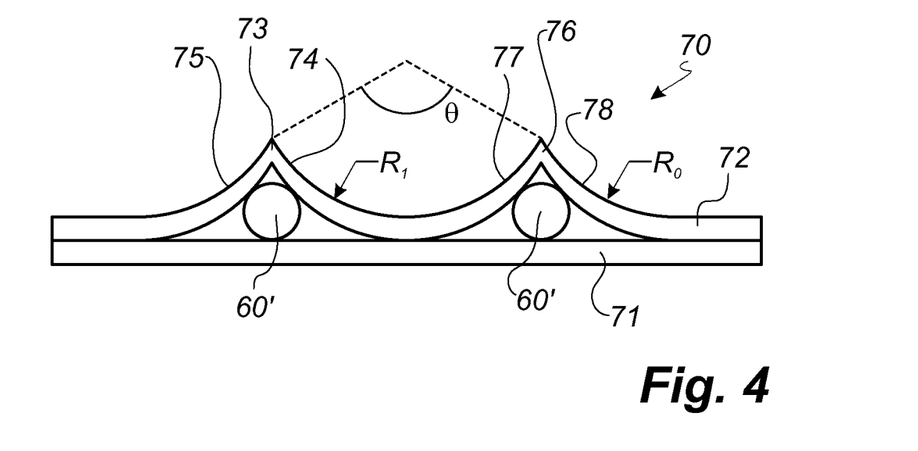
FIG. 4 shows a first embodiment of a pre-cured web foot flange according to the invention.

FIG. 4 shows a first embodiment of a pre-cured web foot flange 70 according to the invention. The web foot flange 70 comprises a base part having a first side for mounting to the inner side of the wind turbine blade shell and an opposed, second side from which a first projection 73 and a second projection 76 extend. The two projections 73, 76 form a recess, which can take up an end of a shear web body.

The pre-cured web foot flange may be formed by a number of outer fibre layers 71 and a number of inner fibre layers 72. A filler material 60' made of fibre reinforcement material is arranged so as to provide the projections 73, 76. The filler material 60' may for instance be ropes comprising reinforcement fibres, such as glass fibres. In the shown embodiment, the filler material 60' is shown as found. However, the filler material 60' may also be shaped in accordance with the desired web foot flange shape, in particular to shape the two projections 73, 76. The first projection comprises an inner side 74 facing the recess and an outer side 75 facing away from the recess. Similarly, the second projection 76 also comprises an inner side 77 facing towards the recess, and an outer side 78 facing away from the recess. The inner sides 74, 77 of the projections may be rounded and have a first curvature radius $R_1$. The entire recess may advantageously follow a circle, e.g. along a measure of arc being approximately 140 degrees. The outer sides 75, 78 may also be rounded having an outer radius of curvature $R_o$, which will provide a smooth transition and thereby also a gradual load transition between the flange and the shear web body.

The pre-cured web foot flange 70 may be moulded in a separate mould. Alternatively, the pre-cured web foot flange may be formed by known pultrusion or extrusion techniques.

Figure 5:
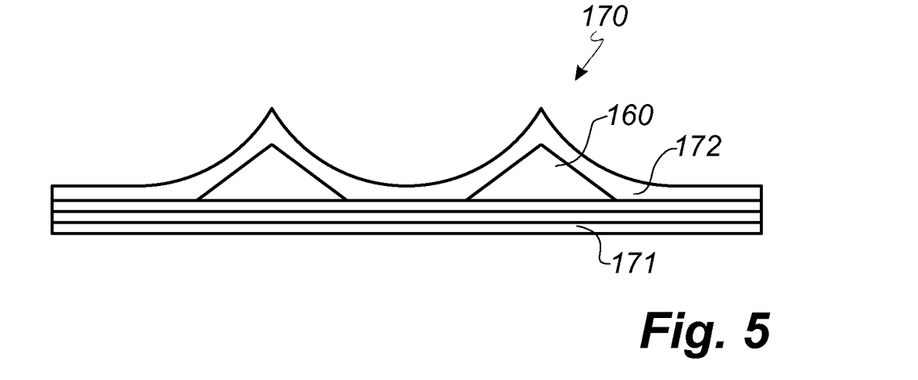
FIG. 5 shows a second embodiment of a pre-cured web foot flange according to the invention.

FIG. 5 shows a second embodiment of a pre-cured web foot flange 170 according to the invention. In this embodiment the projections are formed by a pre-shaped filler material 160. The pre-shaped filler material 160 may for instance be a pultruded or extruded body. In this embodiment, the filler 160 is shaped as a triangular. However, the sides of the pre-shaped filler 160 may also be slightly rounded to provide a rounded shape to the recess of the web foot flange. Similar to the first embodiment, the filler material 170 is covered by a number of outer fibre layers 171 and a number of inner fibre layers 172. As with the first embodiment, the pre-cured web foot flange 170 may be moulded with the pultruded or extruded filler material 170 in a separate mould. Alternatively, the entire body may be formed by extrusion or pultrusion.

Figure 6:
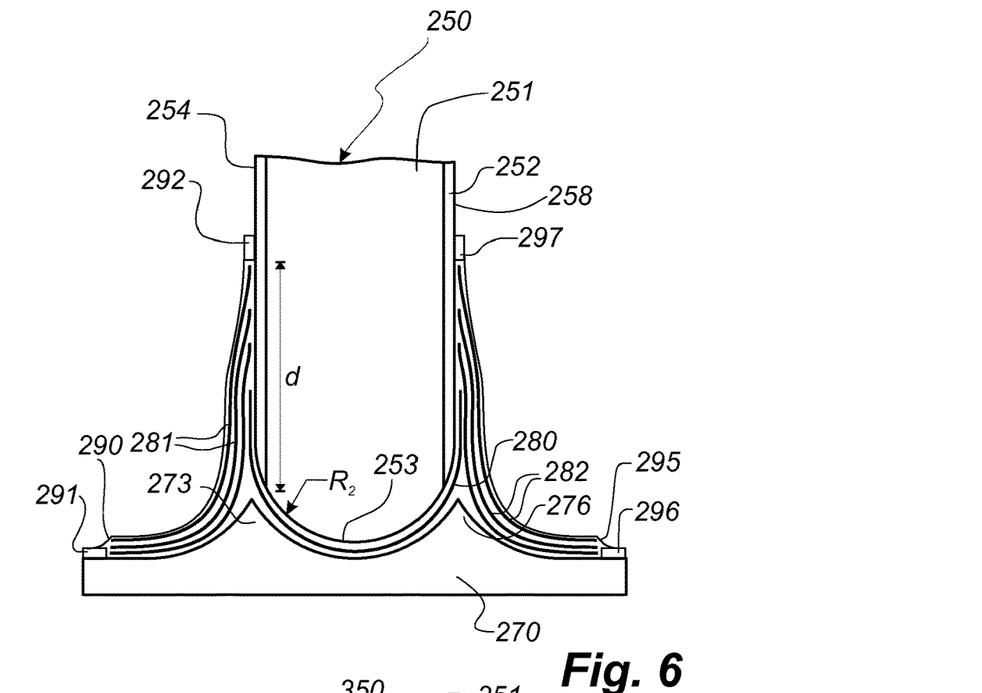
FIG. 6 illustrates a first embodiment of a manufacturing method according to the invention for manufacturing a shear web.

FIG. 6 illustrates a first embodiment of a manufacturing method according to the invention for manufacturing a shear web. In the shown embodiment a first pre-cured web foot flange 270 is laminated onto a first end 253 of a shear web body 250. The pre-cured web foot flange 270 may e.g. be formed like the two embodiments shown in FIGS. 4 and 5.

The shear web body 250 is pre-manufactured and comprises a sandwich core material 251, such as balsawood or foamed polymer, covered by a number of fibre skin layers 252. The shear web body 250 is an elongated body that—when mounted in the wind turbine blade shell—extends in the longitudinal direction of the wind turbine blade and may have a length of 30 metres or more. The shear web body comprises a first side 254 and a second side 258 as well as a first end 253 and a (not shown) second end.

The first end 253 of the shear web body may be rounded or chamfered, e.g. having a second radius $R_2$. The second radius $R_2$ may substantially match or be smaller than the first radius of curvature $R_1$ of the recess, so that the recess of the web foot flange 270 may take up the first end 253 of the shear web body 250 and so that the web foot flange 270 may be angled in relation to the shear web body. It is also possible to use an additional piece, e.g. having a semi-circular profile, in order to form the rounded or chamfered part. The piece may for instance be made of a foamed polymer or balsa-wood.

In one example, the shear web body has a thickness of 32 mm, whereby the second radius $R_2$ may be 16 mm. Further, the first radius of curvature is 17 mm.

A fibre layer 280 is arranged between the recess of the web foot flange 270 and the first end 253 of the shear web body 250. The fibre layer 280 is wrapped around the first end 253 of the shear web body 250 and extends along a part of the first side 254 of the shear web body and along a part of the second side 258 of the shear web body. Further, a number of first fibre layers 281 are arranged along the surface of the web foot flange 270 along the outer side of the first projection 273 and further along the first side 254 of the shear web body 250. Similarly, a number of second fibre layers 282 are arranged along the surface of the web foot flange 270 along the outer side of the second projection 276 and further along the second side 258 of the shear web body 250.

The first fibre layers 281 are covered by a first vacuum bag 290 and are sealed via a first sealant 291 to the web foot flange 270 and a second sealant 292 to the first side 254 of the shear web body 250. Similarly, the second fibre layers 280 are covered by a second vacuum bag 295 and are sealed via a first sealant 296 to the web foot flange 270 and a second sealant 297 to the second side 258 of the shear web body 250. The sealants 291, 292, 296, 297 may for instance be tacky tape or silicone. Thereby, a longitudinally extending mould cavity is formed between the first vacuum bag 290, the second vacuum bag 295, the web foot flange 270 and the shear web body 250. One end of the mould cavity is connected to a vacuum pump and the other end is connected to a resin source. Once the vacuum pump has evacuated the mould cavity, a valve to the resin source is opened and resin is injected into the mould cavity. Finally, the resin is cured so that a laminate bonding is formed between the web foot flange 270 and the first end 253 of the shear web body 250.

In an alternative embodiment, only a single vacuum bag is used which is wrapped around the bottom of the web foot flange 270, whereby the first sealants 291, 296 may be omitted.

The fibre layers 280, 281, 282 may also comprise a prepreg material. However, additional resin may advantageously be infused into the mould cavity as described above.

The pre-cured web foot flange 270 is relatively flexible. Thereby, it can be varied or twisted in the longitudinal direction so that the angle relative to the shear web body may be varied in order to accommodate the shape of the wind turbine blade shell. Alternatively, the web foot flange may be sectionised and provided as individual parts extending along separate parts of the shear web body 250. The attachment method may be carried out by a relatively simple jig setup that holds the pre-manufactured shear web body 250 and the first web foot flange 270. In the shown embodiment, the shear web body 250 and the web foot flange are attached to each other in a setup, where shear web body is arranged in a substantially vertical orientation. Thereby, the resin may be injected from a lower part and flow upwards, which may compensate for air pockets forming and creep of the fibre layers due to gravity. The fibre layers 280, 281, 282 may advantageously be provided with a tackifier or a SAERfix® fabric in order for the fibre layers to maintain their shape during layup. It is also contemplated that the pre-cured web foot flange may be laminated onto the blade shell first and then laminated onto the shear web body.

The fibre layers 280, 281, 282 extend along a length d along the sides 254, 258 of the shear web body. The length may for instance be 10-15 cm.

The second web foot flange may be attached to the second end of the shear web body through a similar attachment method. The shear web body may advantageously be turned 180 degrees and the second web foot flange be attached to the second end of the shear web body in a setup, where the second web foot flange is arranged below the shear web body 250. Alternatively, the second web foot flange may be arranged above the shear web body without having to turn the shear web body 250.

While the attachment method has been described in a setup, where the shear web body is arranged in a vertical orientation, it is recognised that the web foot flanges may also be attached to the shear web body in a setup, where the shear web body is arranged in a horizontal orientation, e.g. by arranging the shear web body on a simple work table.

Figure 7:
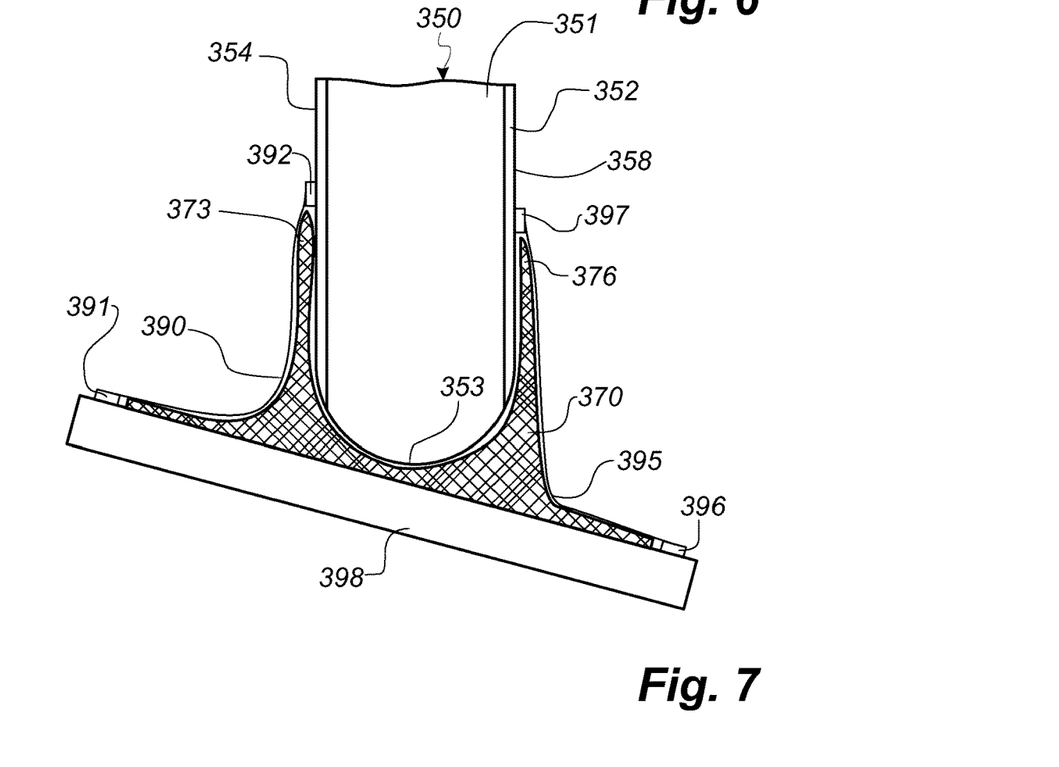
FIG. 7 illustrates a second embodiment of a manufacturing method according to the invention for manufacturing a shear web.

FIG. 7 illustrates a second embodiment of a manufacturing method according to the invention for manufacturing a shear web, in which similar reference numerals refer to like parts of the first embodiment shown in FIG. 6. Therefore, only the differences between the two embodiments are described.

The second embodiment differs from the first embodiment in that the web foot flange 370 is not pre-cured. Instead the web foot flange is pre-formed as a sewn or weaved fibre body, advantageously comprising dry reinforcement fibres. In this embodiment, the fibre layers that are laminated onto the sides 354, 358 of the shear web body 350 are integrally formed as part of the two projections 373, 376 of the web foot flange 370.

Since the pre-formed web foot flange 370 only maintains a rough shape for the final flange, it is necessary to utilise a forming tool in order to define the angle of the base part of the web foot flange 370 relative to the shear web body 350. Accordingly, a primary base plate 398 is utilised to define the angle of the base part of the web foot flange 370 relative to the shear web body 398. The first vacuum bag 390 is sealed to the base plate 398 via a first sealant and to the first side 354 of the shear web body 350 via a second sealant 392. Similarly, the second vacuum bag 395 is sealed to the base plate 398 via a first sealant 396 and to the second side 358 of the shear web body 350. The fibre material of the pre-formed web foot flange 370 may be provided with a tackifier or a SAERfix® fabric in order for the fibre layers to maintain their shape during layup. Alternatively, additional fibre layers comprising e.g. a tackifier or a SAERfix® fabric may be arranged to cover the projections 373, 376 in order to maintain the shape.

The mould cavity formed between the vacuum bags 390, 395, the shear web body 350 and the base plate 398 may be connected to a vacuum pump and a resin source similar to the first embodiment in order to inject resin into the mould cavity and impregnate the fibre material of the pre-formed web foot flange 370. Finally, the resin is cured so that a laminate bonding is formed between the web foot flange 370 and the first end 353 of the shear web body 350.

The reinforcement fibres used in the web foot flanges according to the first and the second embodiment are advantageously glass fibres. The same applies to the additional fibre layers used for laminating the web foot flange onto the shear web body. However, other applicable reinforcement fibre types could also be used.

In the shown embodiments, the ends of the shear web body have been described as rounded. However, it is also possible to use other shapes, such as chamfered or bevelled ends. However, it is advantageous that a large laminate bonding surface is formed between the ends of the shear web body and the recess of the web foot flange in order to provide a stronger mechanical attachment.

LIST OF REFERENCE NUMERALS

| | |
|---|---|
| 2 | wind turbine |
| 4 | tower |
| 6 | nacelle |
| 8 | hub |
| 10 | blade |
| 14 | blade tip |
| 16 | blade root |
| 18 | leading edge |
| 20 | trailing edge |
| 22 | pitch axis |
| 30 | root region |
| 32 | transition region |
| 34 | airfoil region |
| 36 | pressure side shell |
| 38 | suction side shell |
| 40 | shoulder |
| 41 | main laminate/spar cap of pressure side |
| 42 | fibre layers |
| 43 | sandwich core material |
| 45 | main laminate/spar cap of suction side |
| 46 | fibre layers |
| 47 | sandwich core material |
| 50 | first shear web |
| 51 | sandwich core material of first shear web |
| 52 | skin layer(s) |
| 253, 353 | First end of shear web body |
| 254, 354 | First side of shear web body |
| 55 | second shear web |
| 56 | sandwich core material of second shear web |
| 57 | skin layer(s) |
| 258, 358 | Second side of shear web body |
| 60, 60', 160 | Filler |
| 70, 170, 270, 370 | First web foot flange |
| 71, 171 | Fibre layer(s) |
| 72, 172 | Fibre layer(s) |
| 73, 373 | First projection |
| 74 | Inner side of first projection |
| 75 | Outer side of first projection |
| 76, 376 | First projection |
| 77 | Inner side of first projection |
| 78 | Outer side of first projection |
| 280 | Fibre layer(s) |
| 281 | Fibre layer(s) |
| 282 | Fibre layer(s) |
| 290, 390 | Forming tool/vacuum bag |
| 291, 391 | Sealant |
| 292, 392 | Sealant |
| 295, 395 | Forming tool/vacuum bag |
| 296, 396 | Sealant |
| 297, 397 | Sealant |
| 398 | Base plate of forming tool |
| d | Length of fibre layer connection |
| $R_0$ | Radius of curvature of outer side of projection |
| $R_1$ | Radius of curvature of inner side of projection |
| $R_2$ | Radius of curvature of shear web body end |
| θ | Measure of arc |

The invention claimed is:

1. A method of manufacturing a wind turbine blade component in a form of a shear web, the method comprising steps of:
 a) providing a pre-manufactured shear web body having a first side and a second side as well as a first end and a second end;
 b) providing a first pre-formed web foot flange comprising a fibre-reinforcement material, wherein the first pre-formed web foot flange further comprises:
  a base part having a first side and a second side;
  a first projection part projecting from the first side of the base part; and
  a second projection part projecting from the second side of the base part such that a recess is formed between the first projecting part and the second projecting part, wherein the first and second projection parts are formed by filler ropes formed within the first pre-formed web foot flange,
  wherein the recess has a circular cross-section with a first radius, and
  wherein the first end of the pre-manufactured shear web body is rounded and has a second radius substantially less than or equal to the first radius;
 c) providing a second pre-formed web foot flange;
 d) attaching the first pre-formed web foot flange to a first spar cap;
 e) attaching the second pre-formed web foot flange to a second spar cap;
 f) arranging a first fibre layer from each of the first and second pre-formed web foot flanges and to a part of the first side of the pre-manufactured shear web body;
 g) arranging a second fibre layer from each of the first and second pre-formed web foot flanges to a part of the second side of the pre-manufactured shear web body;
 h) supplying a resin to said first fibre layer and said second fibre layer simultaneously with or subsequent to steps f) and g); and
 i) allowing the resin to cure so as to form the shear web, wherein the shear web is connected between the first and second spar caps.

2. The method according to claim 1, wherein a tackifier is supplied to the first fibre layer and the second fibre layer in order to maintain a shape thereof prior to supplying resin to said first and second fibre layers in step h).

3. The method according to claim 1, wherein the pre-manufactured shear web body is a sandwich panel or a sandwich-structured composite member.

4. The method according to claim 1, wherein the method further comprises the step of providing a forming tool adjacent at least the first end of the shear web body to form a mould cavity covering the first pre-formed web foot flange, the first fibre layer, the second fibre layer, and a part of the shear web body near the first end of the shear web body, the forming tool optionally comprising a first vacuum bag and possibly also a second vacuum bag.

5. The method according to claim 4, wherein the resin in step h) is injected into the mould cavity.

6. The method according to claim 1, wherein the pre-manufactured shear web body in step a) is arranged in a substantially vertical position, and wherein the first pre-formed web foot flange is arranged at the first end and below the shear web body.

7. The method according to claim 1, wherein the first fibre layer and the second fibre layer each comprise a multiaxial fibre layer.

8. The method according to claim 7, wherein the multi-axial fibre layer is selected from the group consisting of a biaxial fibre layer, a triaxial fibre layer, and a quadaxial fibre layer.

9. The method according to claim 1, wherein the first pre-formed web foot flange is a pre-cured composite body.

10. The method according to claim 9, wherein the pre-cured composite body is selected from the group consisting of a pultruded body and an extruded body.

11. The method according to claim 1, wherein the first pre-formed web foot flange is a sewn or weaved fibre body.

12. The method according to claim 11, wherein the sewn fibre body comprises dry reinforcement fibres.

13. The method according to claim 1, wherein the recess has an arc measure of between 90° and 180°.

14. The method according to claim 1, wherein the recess has an arc measure of between 120° and 160°.

15. The method according to claim 1, wherein the recess has an arc measure of about 140°.

16. A method of manufacturing a wind turbine blade component in a form of a shear web, the method comprising steps of:
   a) providing a pre-manufactured shear web body having a first side and a second side as well as a first end and a second end;
   b) providing a first pre-formed web foot flange comprising a fibre-reinforcement material, wherein the first pre-formed web foot flange further comprises:
      a base part having a first side and a second side;
      a first projection part projecting from the first side of the base part; and
      a second projection part projecting from the second side of the base part such that a recess is formed between the first projecting part and the second projecting part, wherein the first and second projection parts are formed by filler ropes formed within the first pre-formed web foot flange,
      wherein the recess has a circular cross-section with a first radius, and
      wherein the first end of the pre-manufactured shear web body is rounded and has a second radius substantially less than or equal to the first radius;
   c) providing a second pre-formed web foot flange;
   d) attaching the first pre-formed web foot flange to a first spar cap;
   e) attaching the second pre-formed web foot flange to a second spar cap;
   f) arranging a first fibre layer from each of the first and second pre-formed web foot flanges to a part of the first side of the pre-manufactured shear web body, wherein the recess of the first pre-formed web foot flange engages the first end of the pre-manufactured shear web body such that the first end of the pre-manufactured shear web body is angularly adjustable with respect to the first pre-formed web foot flange;
   g) arranging a second fibre layer from each of the first and second pre-formed web foot flanges to a part of the second side of the pre-manufactured shear web body;
   h) supplying a resin to said first fibre layer and said second fibre layer simultaneously with or subsequent to steps f) and g); and
   i) allowing the resin to cure so as to form the shear web, wherein the shear web is connected between the first and second spar caps.

17. A method of manufacturing a wind turbine blade component in a form of a shear web, the method comprising steps of:
   a) providing a pre-manufactured shear web body having a first side and a second side as well as a first end and a second end;
   b) providing a first pre-formed web foot flange comprising a fibre-reinforcement material, wherein the first pre-formed web foot flange further comprises:
      a base part having a first side and a second side;
      a first projection part projecting from the first side of the base part; and
      a second projection part projecting from the second side of the base part such that a recess is formed between the first projecting part and the second projecting part, wherein each of the first and second projection parts comprise a filler material, the filler material comprising filler ropes formed within the first pre-formed web foot flange;
      wherein the recess has a circular cross-section with a first radius, and
      wherein the first end of the pre-manufactured shear web body is rounded and has a second radius substantially less than or equal to the first radius;
   c) providing a second pre-formed web foot flange;
   d) attaching the first pre-formed web foot flange to a first spar cap;
   e) attaching the second pre-formed web foot flange to a second spar cap;
   f) arranging a first fibre layer from each of the first and second pre-formed web foot flanges to a part of the first side of the pre-manufactured shear web body;
   g) arranging a second fibre layer from each of the first and second pre-formed web foot flanges to a part of the second side of the pre-manufactured shear web body;
   h) supplying a resin to said first fibre layer and said second fibre layer simultaneously with or subsequent to steps f) and g); and
   i) allowing the resin to cure so as to form the shear web, wherein the shear web is connected between the first and second spar caps.

* * * * *